(12) United States Patent
Wang et al.

(10) Patent No.: US 9,926,177 B2
(45) Date of Patent: Mar. 27, 2018

(54) HYDRAULIC JACK

(71) Applicant: BOE Technology Group Co., Ltd., Beijing (CN)

(72) Inventors: Xueyong Wang, Beijing (CN); Yan Chen, Beijing (CN); Xiangjun Tian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/531,798

(22) PCT Filed: Feb. 17, 2016

(86) PCT No.: PCT/CN2016/073911
§ 371 (c)(1),
(2) Date: May 31, 2017

(87) PCT Pub. No.: WO2017/045353
PCT Pub. Date: Mar. 23, 2017

(65) Prior Publication Data
US 2017/0327358 A1 Nov. 16, 2017

(30) Foreign Application Priority Data
Sep. 17, 2015 (CN) .......................... 2015 1 0595694

(51) Int. Cl.
*B66F 3/32* (2006.01)
*F16K 11/085* (2006.01)
(52) U.S. Cl.
CPC ............ *B66F 3/32* (2013.01); *F16K 11/0856* (2013.01)
(58) Field of Classification Search
CPC .......... F15B 11/048; F15B 1/021; F15B 1/24; B66F 2700/057; F16D 31/02; F16K 11/0856
(Continued)

(56) References Cited

U.S. PATENT DOCUMENTS 4,581,893 A * 4/1986 Lindbom .............. F15B 11/048
60/368
6,546,725 B2 * 4/2003 Hu ............................ B66F 3/24
60/413
(Continued)

FOREIGN PATENT DOCUMENTS

CN 2567196 Y 8/2003
CN 100999302 A 7/2007
(Continued)

OTHER PUBLICATIONS

English translation of DE 2910434 (EPO and Google, retrieved from https://worldwide.espacenet.com/ on Dec. 1, 2017).*
(Continued)

*Primary Examiner* — Michael Leslie
*Assistant Examiner* — Richard Drake
(74) *Attorney, Agent, or Firm* — Banner & Witcoff, Ltd.

(57) ABSTRACT

A hydraulic jack includes an oil cylinder, an oil tank, and an oil storage barrel. The oil storage barrel includes a front portion and a back portion which are opposite to each other; an oil outlet of the oil cylinder is connected with an oil inlet at the front portion of the oil storage barrel by means of an oil inlet pipe; and an oil inlet of the oil tank is connected with an oil outlet at the front portion of the oil storage barrel by means of an oil outlet pipe, the oil inlet pipe and the oil outlet pipe are provided with switching valves for alternatively turning on the oil inlet pipe and the oil outlet pipe. A partition plate that is capable of moving along a barrel wall and an elastic telescoping member are provided inside the oil storage barrel.

20 Claims, 3 Drawing Sheets

(58) Field of Classification Search
USPC .................................................. 60/413, 327
See application file for complete search history.

(56) References Cited

U.S. PATENT DOCUMENTS

| | | | | |
|---|---|---|---|---|
| 7,401,467 | B2* | 7/2008 | Gerbier | B66F 3/22 |
| | | | | 60/479 |
| 8,626,326 | B1* | 1/2014 | Theobald | B25J 9/144 |
| | | | | 60/413 |
| 9,512,929 | B2* | 12/2016 | Folkner | F16K 11/076 |
| 2004/0040296 | A1* | 3/2004 | Fan | B66F 3/42 |
| | | | | 60/477 |
| 2013/0036728 | A1* | 2/2013 | Billaud | B66F 9/0655 |
| | | | | 60/327 |
| 2014/0290659 | A1* | 10/2014 | Chen | A61M 16/0096 |
| | | | | 128/205.24 |
| 2016/0195074 | A1* | 7/2016 | Beard | F04B 7/0007 |
| | | | | 417/500 |
| 2016/0305564 | A1* | 10/2016 | Edwards | F16K 11/0856 |

FOREIGN PATENT DOCUMENTS

| | | | | |
|---|---|---|---|---|
| CN | 201330871 Y | 10/2009 | | |
| CN | 201599451 U | 10/2010 | | |
| CN | 102092654 A | 6/2011 | | |
| CN | 202144431 U | 2/2012 | | |
| CN | 105110231 A | 12/2015 | | |
| DE | 2910434 A1 * | 9/1980 | | B66F 3/32 |
| GB | 824634 A | 12/1959 | | |
| NZ | 525803 A | 3/2004 | | |

OTHER PUBLICATIONS

Jun. 13, 2016—International Search Report and Written Opinion Appn PCT/CN2016/073911 with Eng Tran.
Dec. 22, 2016—(CN) First Office Action 201510595694.2 with Eng Tran.

* cited by examiner

HYDRAULIC JACK

The application is a U.S. National Phase Entry of International Application No. PCT/CN2016/073911 filed on Feb. 17, 2016, designating the United States of America and claiming priority to Chinese Patent Application No. 201510595694.2 filed on Sep. 17, 2015. The present application claims priority to and the benefit of the above-identified applications and the above-identified applications are incorporated by reference herein in their entirety.

TECHNICAL FIELD

An embodiment of the present disclosure relates to a hydraulic jack.

BACKGROUND

A jack is a rigid jacking member, i.e., a light hoisting equipment that lifts weights within its capability range via a top bracket. Common jack includes mechanical jack and hydraulic jack.

SUMMARY

An embodiment of the present disclosure provides a hydraulic jack, comprising an oil cylinder, an oil reservoir and an oil storage tank, wherein the oil storage tank includes a front part and a back part opposite to each other, an oil outlet of the oil cylinder is connected to an oil inlet at the front part of the oil storage tank via an oil inlet pipe, an oil inlet of the oil reservoir is connected to an oil outlet at the front part of the oil storage tank via an oil outlet pipe, and a switch valve is arranged on the oil inlet pipe and the oil outlet pipe and configured for turning on one of the oil inlet pipe and the oil outlet pipe while turning off the other, a clapboard and an elastic component are arranged in the oil storage tank, the clapboard is movable between the front part and the back part of the oil storage tank along a wall of the oil storage tank, inner space of the oil storage tank is divided into a front space and a back space located on two opposite sides of the clapboard, the front space is communicated with the oil inlet pipe and the oil outlet pipe, the front space and the back space are not communicated with each other, and the clapboard is connected to the back part of the oil storage tank via the elastic component located in the back space.

In an example, the oil inlet pipe comprises a first oil inlet pipe and a second oil inlet pipe, the oil outlet pipe comprises a first oil outlet pipe and a second oil outlet pipe, an end of the first oil inlet pipe is connected to the oil inlet at the front part of the oil storage tank, an end of the first oil outlet pipe is connected to the oil outlet at the front part of the oil storage tank, an end of the second oil inlet pipe is connected to the oil outlet of the oil cylinder, and an end of the second oil outlet is connected to the oil inlet of the oil reservoir; the switch valve is located between the first oil inlet pipe and the second oil inlet pipe, and between the first oil outlet pipe and the second oil outlet pipe.

In an example, the switch valve comprises a rotatable component, and the first oil inlet pipe, the first oil outlet pipe, the second oil inlet pipe and the second oil outlet pipe are configured to fit the rotatable component; the rotatable component is provided with a first hole and a second hole passing through the rotatable component, and a straight line extending direction of the first hole and a straight line extending direction of the second hole are neither parallel to nor intersected with each other; in a case where the first oil inlet pipe and the second oil inlet pipe are communicated via the first hole, the first oil outlet pipe and the second oil outlet pipe are not communicated, and in a case where the first oil outlet pipe and the second oil outlet pipe are communicated via the second hole, the first oil inlet pipe and the second oil inlet pipe are not communicated.

In an example, the extending direction of the first hole and the extending direction of the second hole are perpendicular to each other.

In an example, a side surface of the rotatable component is a cylindrical surface, and the first oil inlet pipe, the first oil outlet pipe, the second oil inlet pipe and the second oil outlet pipe fit the side surface of the rotatable component.

In an example, at least one bottom surface of the rotatable component is provided with a handle.

In an example, the elastic component is a spring, of which one end is connected to the back part of the oil storage tank while the other end is connected to the clapboard.

In an example, the switch valve further includes a protective body, in which the rotatable component is encapsulated.

In an example, the hydraulic jack further includes an oil return valve, of which one end is connected to the oil outlet of the oil cylinder while the other end is connected to the oil inlet of the oil reservoir.

BRIEF DESCRIPTION OF THE DRAWINGS

In order to clearly illustrate the technical solution of the embodiments of the disclosure, the drawings of the embodiments or in the related art will be briefly described in the following; it is obvious that the described drawings are only related to some embodiments of the disclosure and thus are not limitative of the disclosure.

DETAILED DESCRIPTION

The technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In a related art, a hydraulic jack is filled with hydraulic oil, and ascending and descending of the hydraulic jack is controlled by a pressure of the hydraulic oil. An oil return valve is arranged in an oil return pipe of the hydraulic jack. When the oil return valve is opened, the hydraulic oil returns to the oil reservoir where hydraulic oil is stored in the hydraulic jack, so that the front part bracket of the hydraulic jack descends.

The inventors find that the oil return valve of the hydraulic jack in the related art has to be manually controlled by an operator. It is difficult for an operator to control an extent and time of switching the oil return valve, and it is probable that the front part bracket of the hydraulic jack will descend speedily, risking the operator and object placed on the front part bracket.

An embodiment of the present disclosure provides a hydraulic jack, which can prevent a drop-off of the front part bracket of the hydraulic jack so as to reduce the risk to the operator of the hydraulic jack and the object in the front part bracket.

Figure 1:
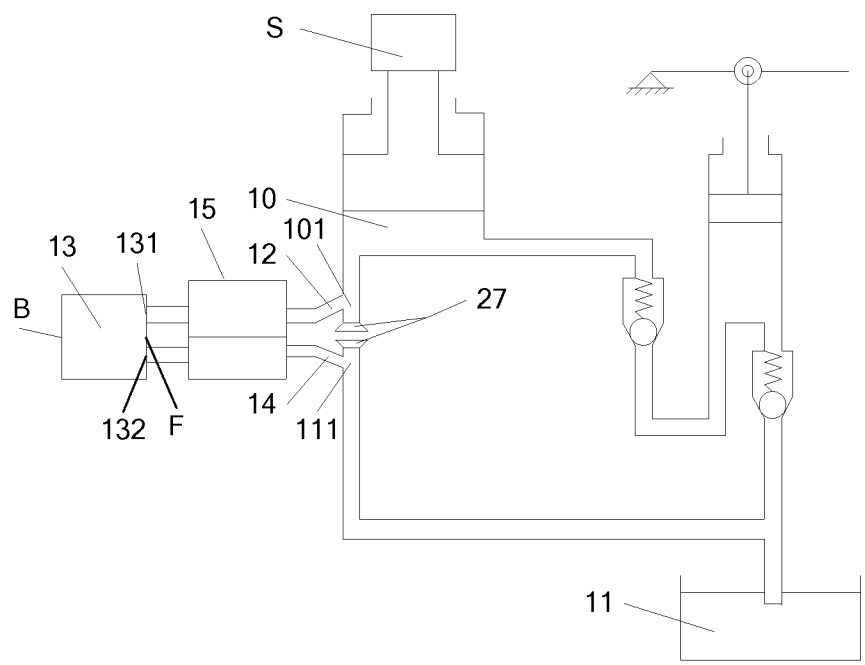
FIG. 1 is a structural schematic diagram of a hydraulic jack in an embodiment of the present disclosure.
Figure 2:
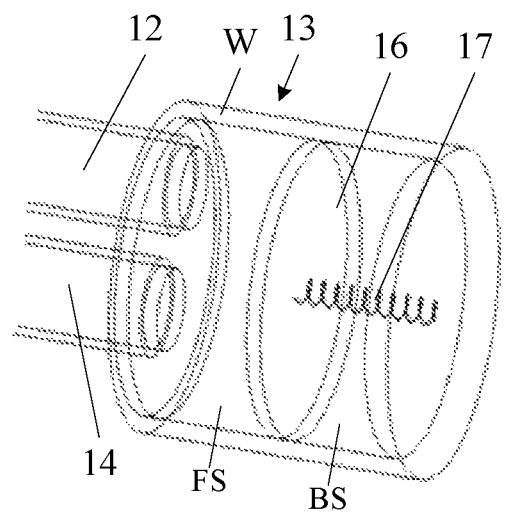
FIG. 2 is a structural schematic diagram of an oil storage tank in the embodiment of the present disclosure.

Referring to FIG. 1 and FIG. 2, the embodiment of the present disclosure provides a hydraulic jack, including an oil cylinder 10, an oil reservoir 11 and an oil storage tank 13. The oil storage tank 13 includes a front part F and a back part B opposite to each other. An oil outlet 101 of the oil cylinder 10 is connected to an oil inlet 131 at the front part F of the oil storage tank 13 via an oil inlet pipe 12, and an oil inlet 111 of the oil reservoir 11 is connected to an oil outlet 132 at the front part F of the oil storage tank 13 via an oil outlet pipe 14. A switch valve 15 is arranged on the oil inlet pipe 12 and the oil outlet pipe 14 and configured for turning on one the oil inlet pipe 12 and the oil outlet pipe 14 while turning off the other; a clapboard 16 which is movable along a wall W of the oil storage tank 13 and an elastic component 17 are arranged in the oil storage tank 13, the elastic component 17 is located between the clapboard 16 and back part B of the oil storage tank 13. The clapboard 16 is movable between the front part F and the back part B of the oil storage tank 13 along the wall W of the oil storage tank. Inner space of the oil storage tank 13 is communicated with the outside only by, for example, the oil inlet 131 and the oil outlet 132 at the front part F. The inner space of the oil storage tank 13 is divided into a front space FS and a back space BS located on two opposite sides of the clapboard. The front space FS is communicated with the oil inlet pipe 12 and the oil outlet pipe 14. The front space FS and the back space BS are not communicated with each other. The clapboard 16 is connected to the back part B of the oil storage tank 13 via the elastic component 17 located in the back space BS.

When the oil inlet pipe 12 is turned on under the control of the switch valve 15, hydraulic oil enters the oil storage tank 13; during the process that the hydraulic oil enters the oil storage tank 13, the hydraulic oil pushes the clapboard 16 in the oil storage tank 13, and the clapboard 16 presses the elastic component 17 so that the elastic component 17 generates an elastic force, and finally the oil pressure of the hydraulic oil entered into the oil storage tank 13 is balanced with the elastic force generated by the elastic component 17 and no more hydraulic oil can enter the oil storage tank 13; at this moment, the switch valve 15 arranged on the oil inlet pipe 12 controls the oil inlet pipe 12 to shut; afterwards, for example, the oil outlet pipe 14 is turned on under the control of the switch valve 15 arranged on the oil outlet pipe 14, the elastic component 17 resiles to push the clapboard 16 to press the hydraulic oil in the oil storage tank 13 out of the oil storage tank 13 via the oil outlet pipe 14, and back to the oil reservoir 11 of the hydraulic jack via the oil outlet pipe 14, so that the hydraulic oil can be recycled. Because the amount of hydraulic oil balanced to the elastic force of the elastic component 17 is constant, the top bracket of the hydraulic jack is lowered at a slower speed.

In the hydraulic jack provided by the embodiment of the present disclosure, the oil cylinder 10 and the oil reservoir 11 are connected to the oil storage tank 13 via the oil inlet pipe 12 and the oil outlet pipe 14 respectively; a clapboard 16 movable along the wall and an elastic component 17 located between the clapboard 16 and the back part of the oil storage tank 13 are arranged in the oil storage tank 13; and a switch valve 15 for controlling opening and closing of the oil inlet pipe 12 or the oil outlet pipe 14 is arranged on the oil inlet pipe 12 and the oil inlet pipe 14. The switch valve 15 is operated to turn on the oil inlet pipe 12 so that the hydraulic oil enters into the oil storage tank 13 until the oil pressure of hydraulic oil in the oil storage tank 13 is balanced with the elastic force of the elastic component 17 in the oil storage tank 13; or, the switch valve 15 is operated to turn on the oil outlet pipe 14 so that the elastic component 17 in the oil storage tank 13 pushes the clapboard 16 to press the hydraulic oil out of the oil storage tank 13. Compared with an oil return valve where the extent and the time of switching is controlled manually in the related art, in the hydraulic jack of the embodiment of the present disclosure, the amount of hydraulic oil that enters the oil storage tank 13 which is balanced with the elastic force of the elastic component 17 is constant, so that the top bracket of the hydraulic jack is lowered at a slower speed, which prevents a big drop-off of the top bracket of the hydraulic jack, reducing the risk to the operator of the hydraulic jack and object in the top bracket.

In a case where multiple hydraulic jacks of the embodiment of the present disclosure are applied to work, the amount of hydraulic oil entering the oil storage tank 13 of each hydraulic jack each time is generally the same, so that when multiple hydraulic jacks are working jointly, the ascending distance of each top bracket of the multiple hydraulic jacks is generally the same, preventing the problem of distance difference of the top brackets of multiple hydraulic jacks caused by manual control over oil return valves in the related art.

Figure 3:
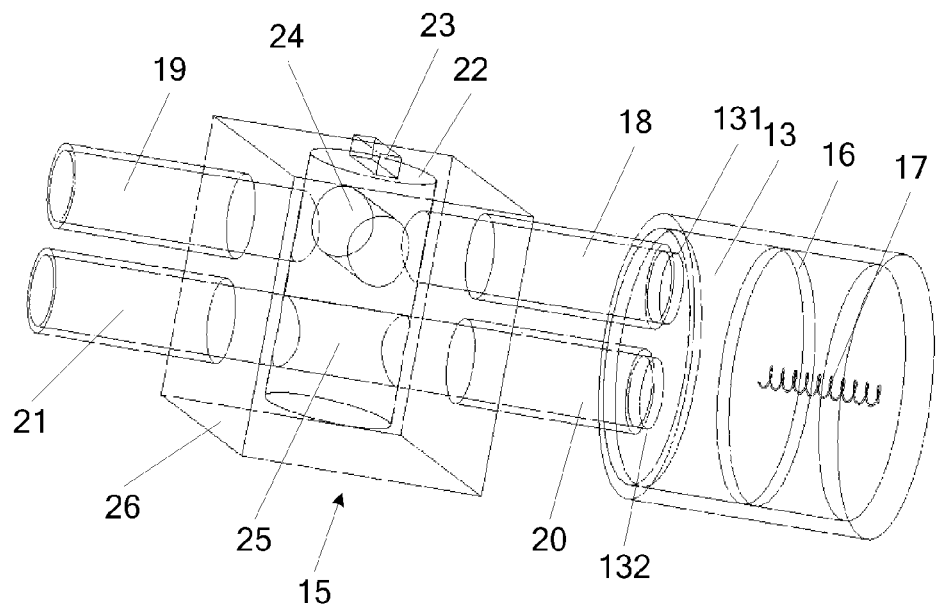
FIG. 3 is a structural schematic diagram of an oil inlet pipe, an oil outlet pipe, a switch valve and an oil storage tank in the embodiment of the present disclosure.

Referring to FIG. 1 and FIG. 3 (the oil reservoir 11 or the oil cylinder 10 are not shown in FIG. 3), for example, the oil inlet pipe 12 includes a first oil inlet pipe 18 and a second oil inlet pipe 19, and the oil outlet pipe 14 includes a first oil outlet pipe 20 and a second oil outlet pipe 21. One end of the first oil inlet pipe 18 is connected to the oil inlet 131 at the front part of the oil storage tank 13 while the other end thereof is connected airtight to the switch valve 15; one end of the first oil outlet pipe 20 is connected to the oil outlet 132 at the front part of the oil storage tank 13 while the other end thereof is connected airtight to the switch valve 15; one end of the second oil inlet pipe 19 is connected to the oil outlet 101 of the oil cylinder 10 while the other end thereof is connected airtight to the switch valve 15; and one end of the second oil outlet is connected to the oil inlet 111 of the oil reservoir 11 while the other end thereof is connected airtight to the switch valve 15; the switch valve 15 configured for turning on one of the oil inlet pipe 12 and the oil outlet pipe 14 while turning off the other is located between the first oil inlet pipe 18 and the second oil inlet pipe 19, and between the first oil outlet pipe 20 and the second oil outlet pipe 21. In this case, the expression "turning on the oil inlet pipe 12" refers to communicating the first oil inlet pipe 18 and the second oil inlet pipe 19; the expression "turning on the oil outlet pipe 14" refers to communicating the first oil outlet pipe 20 and the second oil outlet pipe 21. The expression "the switch valve 15 configured for turning on one of the oil inlet pipe 12 and the oil outlet pipe 14 while turning off the other" refers to that the switch valve 15 is configured for turning off the oil outlet pipe 14 upon turning on the oil inlet pipe 12 on one hand, and turning off the oil inlet pipe 12 upon turning on the oil outlet pipe 14 on the other hand.

Figure 4:
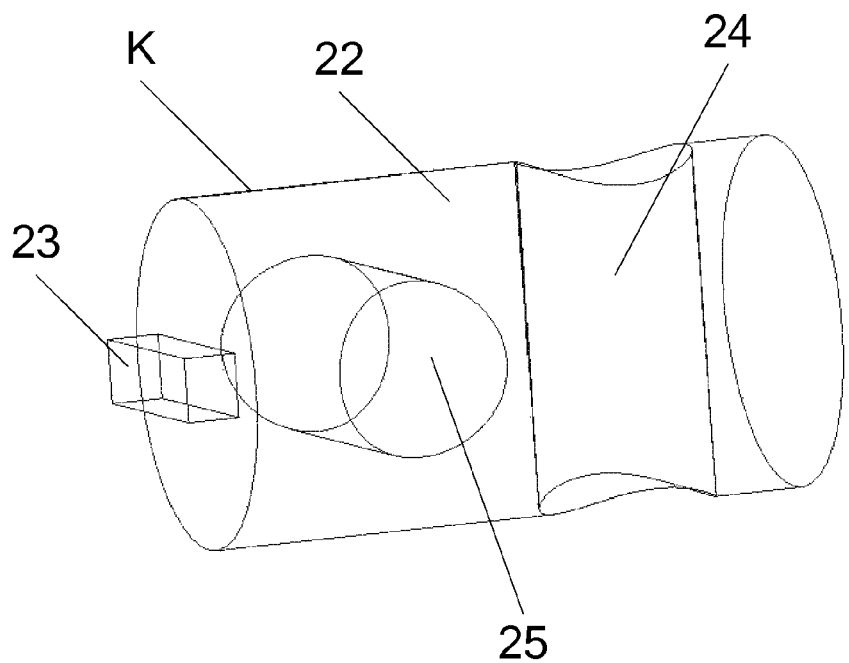
FIG. 4 is a structural schematic diagram of the switch valve in the embodiment of the present disclosure.
Figure 5:
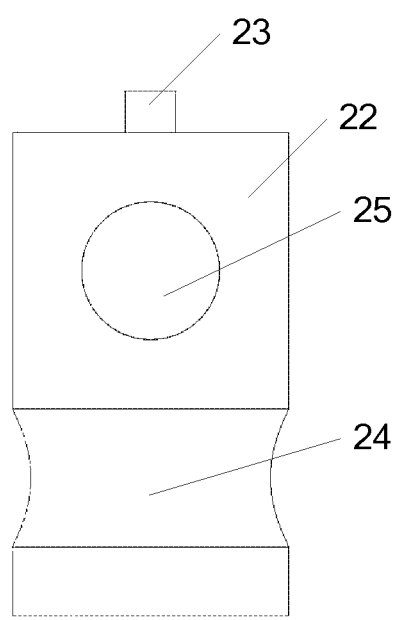
FIG. 5 is a sectional view of the switch valve in the embodiment of the present disclosure.

Referring to FIG. 4 and FIG. 5, in order to facilitate the operation of the switch valve 15, the switch valve 15 includes, for example, a rotatable component 22 placed between the first oil inlet pipe 18 and the second oil inlet pipe 19 and between the first oil outlet pipe 20 and the second oil outlet pipe 21. A side surface K of the rotatable component 22 is, for example, a cylindrical side surface. For example, the rotatable component 22 is cylinder-shaped. All of the first oil inlet pipe 18, the first oil outlet pipe 20, the second oil inlet pipe 19 and the second oil outlet pipe 21 fit the cylinder-shaped side surface K of the rotatable component 22; in order to facilitate an operator to rotate the rotatable component 22 of the switch valve 15, at least one bottom surface of the rotatable component 22 is provided with a handle 23; the rotatable component 22 is provided with a first hole 24 and a second hole 25 passing therethrough. A straight line extending direction of the first hole 24 and a straight line extending direction of the second hole 25 are neither parallel to nor intersected with each other. For example, the extending direction of the first hole 24 and the extending direction of the second hole 25 are perpendicular to each other; when the rotatable component 22 rotates to a certain angle, the first hole 24 is communicated with the first oil inlet pipe 18 and the second oil inlet pipe 19 while the second hole 25 is not communicated with either of the first oil outlet pipe 20 and the second oil outlet pipe 21 so that the first oil outlet pipe 20 and the second oil outlet pipe 21 are not communicated with each other. Then, the hydraulic oil from the oil cylinder 10 can pass through the second oil inlet pipe 19, the first hole 24 and the first oil inlet pipe 18 sequentially and enter into the oil storage tank 13; when the rotatable component 22 rotates to another angle, the second hole 25 is communicated with the first oil outlet pipe 20 and the second oil outlet pipe 21 while the first hole 24 is not communicated with either of the first oil inlet pipe 18 and the second oil inlet pipe 19 so that the first oil inlet pipe 18 and the second oil inlet pipe 19 are not communicated with each other. Then, the hydraulic oil from the oil storage tank 13 can pass through the first oil outlet pipe 20, the second hole 25 and the second oil outlet pipe 21 sequentially and enter into the oil reservoir 11. In order to protect the rotatable component 22, the switch valve 15 can also include a protective body 26. The rotatable component 22 can be encapsulated in the protective body 26. The protective body 26 can either be of a solid or hollow structure.

The elastic component 17 in the above embodiment can be, for example, a spring, of which one end is connected to the back part of the oil storage tank 13 while the other end is connected to the clapboard 16; when the first hole 24 communicates the first oil inlet pipe 18 and the second oil inlet pipe 19, the first oil outlet pipe 20 is not communicated with the second oil inlet pipe 19, hydraulic oil enters into the oil storage tank 13 and pushes the clapboard 16, the clapboard 16 drives the spring connected to the clapboard 16, and the spring is compressed to generate elastic force, and finally the oil pressure of the hydraulic oil in the oil storage tank 13 is balanced with the elastic force generated from compression of the spring; when the second hole 25 communicates the first oil outlet pipe 20 with the second oil outlet pipe 21, the first oil outlet pipe 20 and the second oil outlet pipe 21 are not communicated, and the compressed spring in the oil storage tank 13 tends to resile, and thus, the spring pushes the clapboard 16 to push the hydraulic oil in the oil storage tank 13 out.

Referring to FIG. 1, the hydraulic jack in the embodiment of the present disclosure can further include an oil return valve 27 of which one end is connected to the oil outlet 101 of the oil cylinder 10 while the other end thereof is connected to the oil inlet 111 of the oil reservoir 11. In an ordinary circumstance (for example, in a case where it is not necessary for a front part bracket S of a hydraulic jack to descend speedily), the oil return valve 27 is closed the oil outlet 101 of the oil cylinder 10 is not communicated with the oil inlet 111 of the oil reservoir 11, and the hydraulic oil in the oil cylinder 10 enters into the oil reservoir via the oil storage tank 13; when it is necessary for the top bracket S of the hydraulic jack to descend speedily, the oil return valve 27 is open, the oil outlet 101 of the oil cylinder 10 is communicated with the oil inlet 111 of the oil reservoir, and the hydraulic oil in the oil cylinder 10 may directly enter the oil reservoir 11 via the oil return valve, so that the hydraulic oil in the oil cylinder 10 is released speedily, and a rapid drop-off of the top bracket of the hydraulic jack is realized. Based on what is needed for application, the descending manner of the hydraulic jack can be selected flexibly by using a component for releasing hydraulic oil in the oil cylinder 10.

In the above description on the implementation modes, the features, structures, materials and characteristics can be combined in an appropriate way in any one or more embodiments or examples.

Although the embodiment of the disclosure has been described above in great detail with general descriptions and specific embodiments, on the basis of the embodiment of the disclosure, various changes and improvements may be made, which is apparent to those skilled in the art. Therefore, all such changes and improvements without departing from the spirit of the disclosure are within the scope of the claims of the disclosure.

The present application claims priority of Chinese Patent Application No. 201510595694.2 filed on Sep. 17, 2015, the disclosure of which is incorporated herein by reference in its entirety as part of the present application.

The invention claimed is:

1. A hydraulic jack, comprising an oil cylinder, an oil reservoir and an oil storage tank, wherein
    the oil storage tank includes a front part and a back part opposite to each other, an oil outlet of the oil cylinder is connected to an oil inlet at the front part of the oil storage tank via an oil inlet pipe, an oil inlet of the oil reservoir is connected to an oil outlet at the front part of the oil storage tank via an oil outlet pipe, and a switch valve is arranged on the oil inlet pipe and the oil outlet pipe and configured for turning on one of the oil inlet pipe and the oil outlet pipe while turning off the other,
    a clapboard and an elastic component are arranged in the oil storage tank, the clapboard is movable between the front part and the back part of the oil storage tank along a wall of the oil storage tank, inner space of the oil storage tank is divided into a front space and a back space located on two opposite sides of the clapboard, the front space is communicated with the oil inlet pipe and the oil outlet pipe, the front space and the back space are not communicated with each other, and the clapboard is connected to the back part of the oil storage tank via the elastic component located in the back space.

2. The hydraulic jack according to claim 1, wherein the oil inlet pipe comprises a first oil inlet pipe and a second oil inlet pipe, the oil outlet pipe comprises a first oil outlet pipe and a second oil outlet pipe, an end of the first oil inlet pipe is connected to the oil inlet at the front part of the oil storage tank, an end of the first oil outlet pipe is connected to the oil outlet at the front part of the oil storage tank, an end of the second oil inlet pipe is connected to the oil outlet of the oil cylinder, and an end of the second oil outlet is connected to the oil inlet of the oil reservoir; the switch valve is located between the first oil inlet pipe and the second oil inlet pipe, and between the first oil outlet pipe and the second oil outlet pipe.

3. The hydraulic jack according to claim 2, wherein the switch valve comprises a rotatable component, and the first oil inlet pipe, the first oil outlet pipe, the second oil inlet pipe and the second oil outlet pipe are configured to fit the rotatable component; the rotatable component is provided with a first hole and a second hole passing through the rotatable component, and a straight line extending direction of the first hole and a straight line extending direction of the second hole are neither parallel to nor intersected with each other; in a case where the first oil inlet pipe and the second oil inlet pipe are communicated via the first hole, the first oil outlet pipe and the second oil outlet pipe are not communicated, and in a case where the first oil outlet pipe and the second oil outlet pipe are communicated via the second hole, the first oil inlet pipe and the second oil inlet pipe are not communicated.

4. The hydraulic jack according to claim 3, wherein the extending direction of the first hole and the extending direction of the second hole are perpendicular to each other.

5. The hydraulic jack according to claim 3, wherein a side surface of the rotatable component is a cylindrical surface, and the first oil inlet pipe, the first oil outlet pipe, the second oil inlet pipe and the second oil outlet pipe fit the side surface of the rotatable component.

6. The hydraulic jack according to claim 5, wherein at least one bottom surface of the rotatable component is provided with a handle.

7. The hydraulic jack according to claim 1, wherein the elastic component is a spring, of which one end is connected to the back part of the oil storage tank while the other end is connected to the clapboard.

8. The hydraulic jack according to claim 3, wherein the switch valve comprises a protective body, in which the rotatable component is encapsulated.

9. The hydraulic jack according to claim 1, further comprising an oil return valve, of which one end is connected to the oil outlet of the oil cylinder while the other end is connected to the oil inlet of the oil reservoir.

10. The hydraulic jack according to claim 4, wherein a side surface of the rotatable component is a cylindrical surface, and the first oil inlet pipe, the first oil outlet pipe, the second oil inlet pipe and the second oil outlet pipe fit the side surface of the rotatable component.

11. The hydraulic jack according to claim 2, wherein the elastic component is a spring, of which one end is connected to the back part of the oil storage tank while the other end is connected to the clapboard.

12. The hydraulic jack according to claim 3, wherein the elastic component is a spring, of which one end is connected to the back part of the oil storage tank while the other end is connected to the clapboard.

13. The hydraulic jack according to claim 4, wherein the elastic component is a spring, of which one end is connected to the back part of the oil storage tank while the other end is connected to the clapboard.

14. The hydraulic jack according to claim 5, wherein the elastic component is a spring, of which one end is connected to the back part of the oil storage tank while the other end is connected to the clapboard.

15. The hydraulic jack according to claim 6, wherein the elastic component is a spring, of which one end is connected to the back part of the oil storage tank while the other end is connected to the clapboard.

16. The hydraulic jack according to claim 4, wherein the switch valve comprises a protective body, in which the rotatable component is encapsulated.

17. The hydraulic jack according to claim 5, wherein the switch valve comprises a protective body, in which the rotatable component is encapsulated.

18. The hydraulic jack according to claim 6, wherein the switch valve comprises a protective body, in which the rotatable component is encapsulated.

19. The hydraulic jack according to claim 2, further comprising an oil return valve, of which one end is connected to the oil outlet of the oil cylinder while the other end is connected to the oil inlet of the oil reservoir.

20. The hydraulic jack according to claim 3, further comprising an oil return valve, of which one end is connected to the oil outlet of the oil cylinder while the other end is connected to the oil inlet of the oil reservoir.

* * * * *